United States Patent
Suzuki et al.

(10) Patent No.: US 7,023,123 B2
(45) Date of Patent: Apr. 4, 2006

(54) MOTOR AND PANEL METER INCORPORATING SAME

(75) Inventors: Yuzuru Suzuki, Shizuoka (JP); Kunitake Matsushita, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/618,212

(22) Filed: Jul. 10, 2003

(65) Prior Publication Data
US 2004/0012273 A1 Jan. 22, 2004

(30) Foreign Application Priority Data
Jul. 11, 2002 (JP) ............................. 2002-202188

(51) Int. Cl.
*H02K 5/16* (2006.01)

(52) U.S. Cl. ........................ 310/261; 310/90; 310/42; 362/26

(58) Field of Classification Search ............ 310/49 R, 310/90, 61, 67 R, 257, 261; 362/26, 30; 116/288
See application file for complete search history.

(56) References Cited

U.S. PATENT DOCUMENTS

| 3,872,691 A | * | 3/1975 | Hildebrandt | ............... 464/87 |
| 4,475,035 A | * | 10/1984 | Eaton et al. | ............... 250/236 |
| 5,218,258 A | * | 6/1993 | Shirasu et al. | ......... 310/323.03 |
| 5,703,612 A | * | 12/1997 | Salmon et al. | ......... 340/815.78 |
| 6,144,120 A | * | 11/2000 | Doi et al. | ................ 310/49 R |
| 6,211,585 B1 | * | 4/2001 | Sato et al. | ................ 310/49 R |
| 6,302,552 B1 |   | 10/2001 | Ross et al. | |
| 6,338,561 B1 | * | 1/2002 | Ikarashi | ...................... 362/26 |
| 6,379,015 B1 | * | 4/2002 | Wilhelm et al. | ............. 362/23 |
| 6,408,784 B1 | * | 6/2002 | Ross | ......................... 116/288 |
| 6,664,684 B1 | * | 12/2003 | Kobschaetzky | ............. 310/90 |
| 6,946,765 B1 | * | 9/2005 | Rapp et al. | ................. 310/90 |

FOREIGN PATENT DOCUMENTS

| DE | 195 38 547 A1 | 4/1997 |
| FR | 2 679 998 A1 | 2/1993 |
| JP | H5-1613333 | 6/1993 |
| JP | H9-222338 | 8/1997 |

* cited by examiner

*Primary Examiner*—Darren Schuberg
*Assistant Examiner*—Nguyen Hanh
(74) *Attorney, Agent, or Firm*—Townsend and Townsend and Crew LLP

(57) ABSTRACT

A motor has a hollow-cylindrical shaped rotary shaft provided with a hollow therein and is mounted on a PCB having an LED as light source. Light emitted from the LED passes through the hollow from one end of the rotary shaft to the other end, and irradiates an indicating needle attached to the other end of the rotary shaft.

5 Claims, 6 Drawing Sheets

MOTOR AND PANEL METER INCORPORATING SAME

BACKGROUND OF THE INVENTION

1. Field of the Invention

The present invention relates to a motor and a panel meter incorporating the motor.

2. Description of the Related Art

In recent years, a stepping motor has been used as an actuator, in a movable section of a panel meter in an automobile such as a speed meter and a tachometer. Stepping motors used for the panel meter of the automobile or the like have been disclosed, for example, in Unexamined Japanese Patent Application KOKAI Publications No. H5-161333 and H9-222338.

The stepping motor is a component of the movable section of the panel meter and is arranged between a display board having a scale to indicate a measured amount or value and a printed circuit board (PCB). An indicating needle is attached to one end of a rotary shaft that the stepping motor has.

In order to improve the visibility of the panel meter, it is necessary to guide (lead) light to the indicating needle and the display board having a scale with characters and so forth. Conventionally, in order to improve the visibility of the panel meter, and especially of the indicating needle, for example, a luminous element is arranged on the PCB, and an optical path is formed such that a light conductive plate made of a light-transmissible resin such as an acrylic resin is arranged between the back surface of the display board. Light emitted from the luminous element as a light source is guided from the back of the display board to the indicating needle so as to illuminate the indicating needle and the display board.

The conventional panel meter uses light conductive plate to guide the light to the indicating needle, etc. for obtaining a good visibility. However, using the light conductive plate results in a complicated structure of the panel meter. Besides, it is difficult to guide the light emitted in a relatively wide range to the indicating needle efficiently by the structure described above.

Furthermore, since the dimension, especially the thickness of the light conductive plate must be taken into consideration when designing the panel meter, the degree of freedom in designing is limited.

SUMMARY OF THE INVENTION

The present invention has been made in view of the above described circumstances, and it is an object of the present invention to provide a motor which is used as a movable section of a meter and capable of improving a visibility of the meter with a simple structure, and a panel meter which incorporates the motor.

Another object thereof is to provide a motor which is capable of guiding (leading) light to one end of its rotary shaft thereby illuminating an indicating needle, and a panel meter which incorporates the motor.

In order to achieve the above-described object, according to a first aspect of the present invention, a motor comprises a rotary shaft which allows light to pass therethrough in an axial direction.

The structure enables light to be highly efficiently guided to the front end of the rotary shaft.

According to a second aspect of the present invention in the motor of the first aspect, the rotary shaft is hollow cylindrical with its both ends open.

According to a third aspect of the present invention in the motor of the first aspect, a light source which supplies light to one end of the rotary shaft is provided.

According to a fourth aspect of the present invention in the motor of the second aspect, a light source which supplies light to one end of the rotary shaft is provided.

According to a fifth aspect of the present invention in the motor of the first aspect, at least an optical fiber goes through the rotary shaft and has its one end connected with the light source.

According to a six aspect of the present invention in the motor of the second aspect, at least an optical fiber goes through the rotary shaft and has its one end connected with the light source.

According to a seventh aspect of the present invention in the motor of the second aspect, the inside of the rotary shaft is filled with a light-transmissible resin.

According to a eighth aspect of the present invention in the motor of the second aspect, the inner wall of the rotary shaft is coated with a light-reflecting layer.

According to a ninth aspect of the present invention in the motor of the second aspect, the rotary shaft is made of a metallic material.

According to a tenth aspect of the present invention, a panel meter comprises a display board which has a scale and an opening formed therein, a motor which is arranged at one side surface of the display board and which includes a rotary shaft having its one end passing through the opening of the display board so as to protrude from the other side surface of the display board, the rotary shaft allowing light to pass therethrough in an axial direction and an indicating needle which is attached to the one end of the rotary shaft so as to receive the light having passed through the rotary shaft.

With the above-described structure, light can be directly guided to the indicating needle through a rotary shaft, and therefore, can be efficiently utilized with dissipation. Consequently, it is possible to obtain a good luminance for the indicating needle with a relatively low consumption of luminous energy, thereby improving visibility of the panel meter.

Also, light can be efficiently utilized only by means of the hollow-cylindrical rotary shaft with a hollow. Therefore, no additional element or structure (light-transmissible resin layer) for guiding the light to an indicating needle is required, thereby making the structure simple. Further, since an LED is disposed behind a PCB, the motor can be entirely designed with a high degree of freedom.

And, since the rotary shaft is made of metal, its durability at the bearings does not deteriorate thus maintaining a product life as long as a conventional motor.

Figure 1:
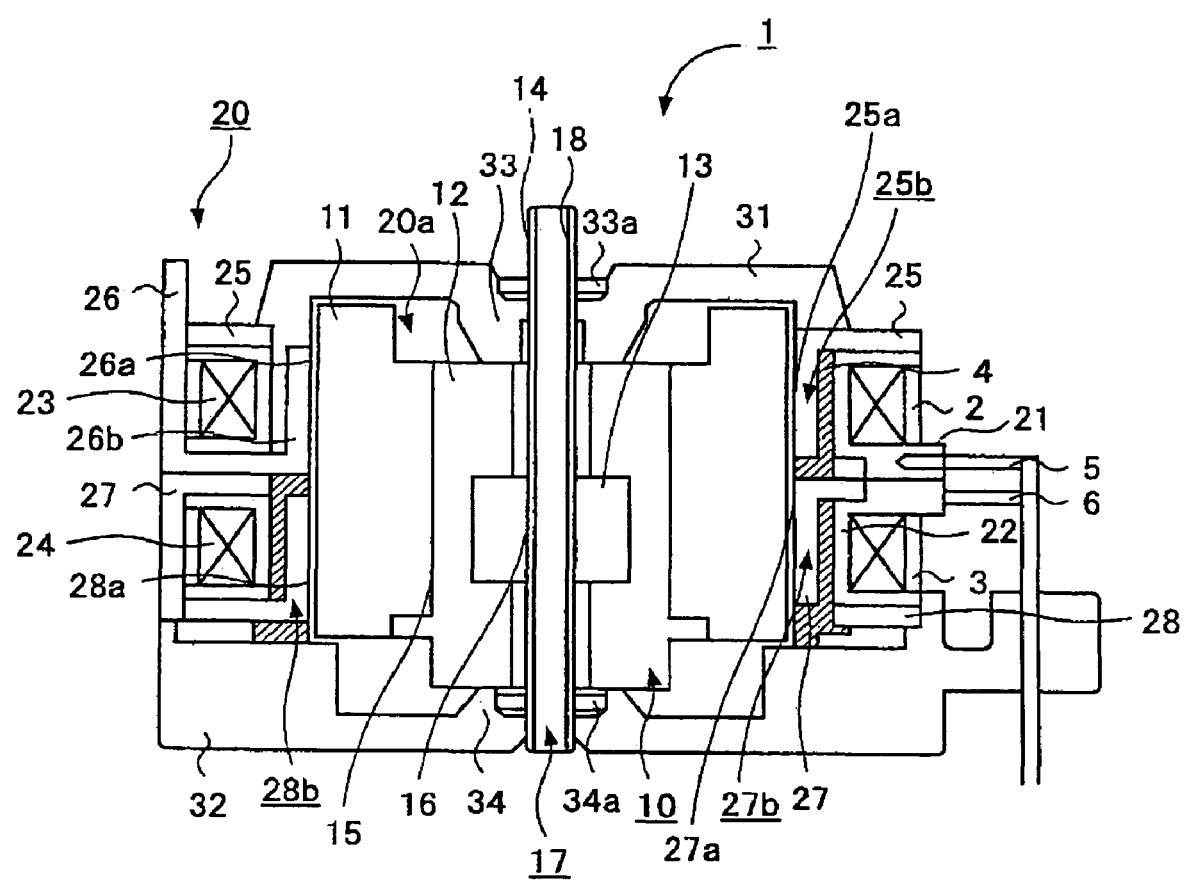
FIG. 1 shows a sectional view of a stepping motor according to the first embodiment of the present invention.

DETAILED DESCRIPTION OF THE
PREFERRED EMBODIMENTS

Preferred embodiments of the present invention will hereinafter be described with reference to the accompanying drawings. The following preferred embodiments of the present invention will be explained, by taking three examples of using a stepping motor and a panel meter having the same.

A first embodiment of the present invention will be described referring to FIG. 1.

A stepping motor 1 of the present invention which is used as a component of an actuator in the movable section of a panel meter such as a speed meter and a tachometer, essentially comprises a rotor assembly 10, a stator assembly 20, a front plate 31 and a rear plate 32.

The rotor assembly 10 comprises a cylindrical rotor magnet 11, a resin sleeve 12, a sleeve 13 and a rotary shaft 14.

The cylindrical rotor magnet 11 is made of a magnetic material such as hard ferrite and has an opening 15 at its center.

The opening 15 has a diameter to well house the resin sleeve 12. The resin sleeve 12 is made of a thermoplastic resin such as polybutylene terephthalate (PBT) resin and fixes the sleeve 13 into the opening 15. The sleeve 13 and the cylindrical rotor magnet 11 are resin-molded integrally with each other, in which process the resin sleeve 12 is formed. The sleeve 13 is made of aluminum, brass, etc. and has an opening 16 at its center. The opening 16 has a diameter substantially equal to an outer diameter of the rotary shaft 14.

Figure 2:
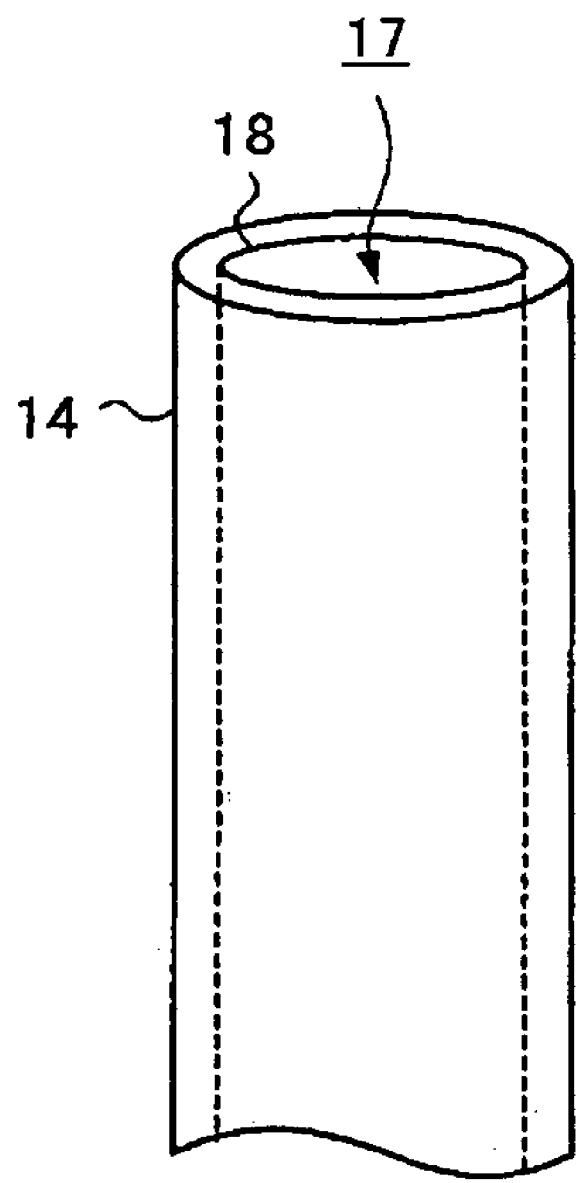
FIG. 2 shows a perspective view of a rotary shaft of the stepping motor shown in FIG. 1.

The rotary shaft 14 is made of metal such as stainless steel, and has a hollow 17 extending from one end to the other end thereof as shown in FIGS. 1 and 2. The hollow 17 forms an optical path for guiding light to one end of the rotary shaft 14. A light-reflecting layer 18 is coated on an inner wall of the hollow 17 so as to reflect light, thereby preventing attenuation of the light. The light-reflecting layer 18 is made of a reflective material such as silver. The rotary shaft 14 may employ a structure without the light-reflecting layer 18.

Referring again to FIG. 1, the stator assembly 20 comprises a molding resin 4, bobbins 21 and 22, exciting coils 23 and 24, stator yokes 25, 26, 27 and 28, and cover rings 2 and 3 made of resin.

The molding resin 4 is made of PBT resin, positions and integratelly fixes each individual part/component of the stator assembly 20.

The stator yokes 25, 26, 27 and 28 are each made of a thin steel sheet having magnetism such as a pure iron sheet. A pair of stator yokes 25 and 26 house the bobbin 21 and another pair of stator yokes 27 and 28 house the bobbin 22. The stator yokes 25, 26, 27 and 28 have respective hollows 25a, 26a, 27a and 28a provided at their center. A plurality of teeth 25b, a plurality of teeth 26b, a plurality of teeth 27b and a plurality of teeth 28b are provided along respective inner circumferences of the stator yokes 25, 26, 27 and 28 and form magnetic paths of the exciting coils 23 and 24.

FIG. 1 shows only each one of the pluralities of teeth 25b, 26b, 27b and 28b for the purpose of viewing convenience.

The stator yokes 25 and 26 are firmly coupled to each other for forming one stator unit, and the stator yokes 27 and 28 are coupled to each other for forming the other stator unit. One of these stator units is stacked onto the other. The hollows 25a, 26a, 27a and 28a in combination constitute a hollow. 20a.

The hollow 20a has a volume, a size and a diameter, etc. as to allow the rotor assembly 10 to freely rotate therein. Specifically, there is a predetermined clearance between respective pluralities of pole teeth 25b, 26b, 27b and 28b and the cylindrical rotor magnet 11, when the rotor assembly 10 is rotatably held within the hollow 20a. The bobbins 21 and 22 are made of resin such as PBT resin, and are each shaped like a letter "H" in cross section with a cylindrical spool portion for having a magnet wire wound therearound. The exciting coils 23 and 24 are each formed such that a magnet wire is wound in many turns on the spool. Also, the exciting coils 23 and 24 have their wound magnet wires covered by the cover rings 2 and 3 respectively for the purpose of insulation and secure retention.

The bobbins 21 and 22 having respective exciting coils 23 and 24 thereon are housed respectively in the one stator unit comprising the stator yokes 25 and 26 and the other stator unit comprising the stator yokes 27 and 28. The stator units form the stator assembly 20. Also, the bobbins 21 and 22 have respective terminal pins 5 and 6 to provide the exciting coils 23 and 24 with electric current.

The front plate 31 and the rear plate 32 are both made of resin and have respective projections 33 and 34 at their centers to prevent axial play of the rotor assembly 10.

The projections 33 and 34 have respective bearings 33a and 34a to rotatably support the rotary shaft 14.

Next, how to assemble the stepping motor 1 will be explained. The rotor magnet 11 and the sleeve 13 are molded by resin such as PBT resin integrally with each other, thus forming the resin sleeve 12 therebetween. Then, the rotary shaft 14 is press-fitted into the opening 16 of the sleeve 13 to form the rotor assembly 10.

The exciting coils 23 and 24 are formed ad described above such that magnet wires are wound on the bobbins 21 and 22 respectively. The thickness, length and number of turns of the magnet wire and the diameter of spool portion of the bobbins 21 and 22 may be appropriately determined according to applications of the stepping motor 1.

The exciting coils 23 and 24 have their outer circumferences covered by the cover rings 2 and 3 respectively. The stator assembly 20 is fabricated such that the exciting coils 23 and 24 wound on the respective bobbins 21 and 22 are housed respectively in the one stator unit comprising the stator yokes 25 and 26 coupled to each other, and the other stator unit comprising the stator yokes 27 and 28 coupled to each other. Two of these stator units are coupled by resin molding so as to position (align) the individual parts/components in place. And the rotor assembly 10 is placed in the hollow 20a formed by the inner circumferences of the stator yokes 25, 26, 27 and 28.

One end of the rotary shaft 14 is let through the bearing 34a of the rear plate 32 so that the rotor assembly 10 and the stator assembly 20 are placed over the rear plate 32 and the other end of the rotary shaft 14 is let through the bearing 33a of the front plate 31 so that the front plate 31 is placed over the rotor assembly 10 and the stator assembly 201. The front plate 31 is made of a thermoplastic resin such as PBT resin which is also used in the fabrication of the stator assembly 20.

The stepping motor 1 thus assembled can be used as the component of the actuator in the panel meter.

Figure 3:
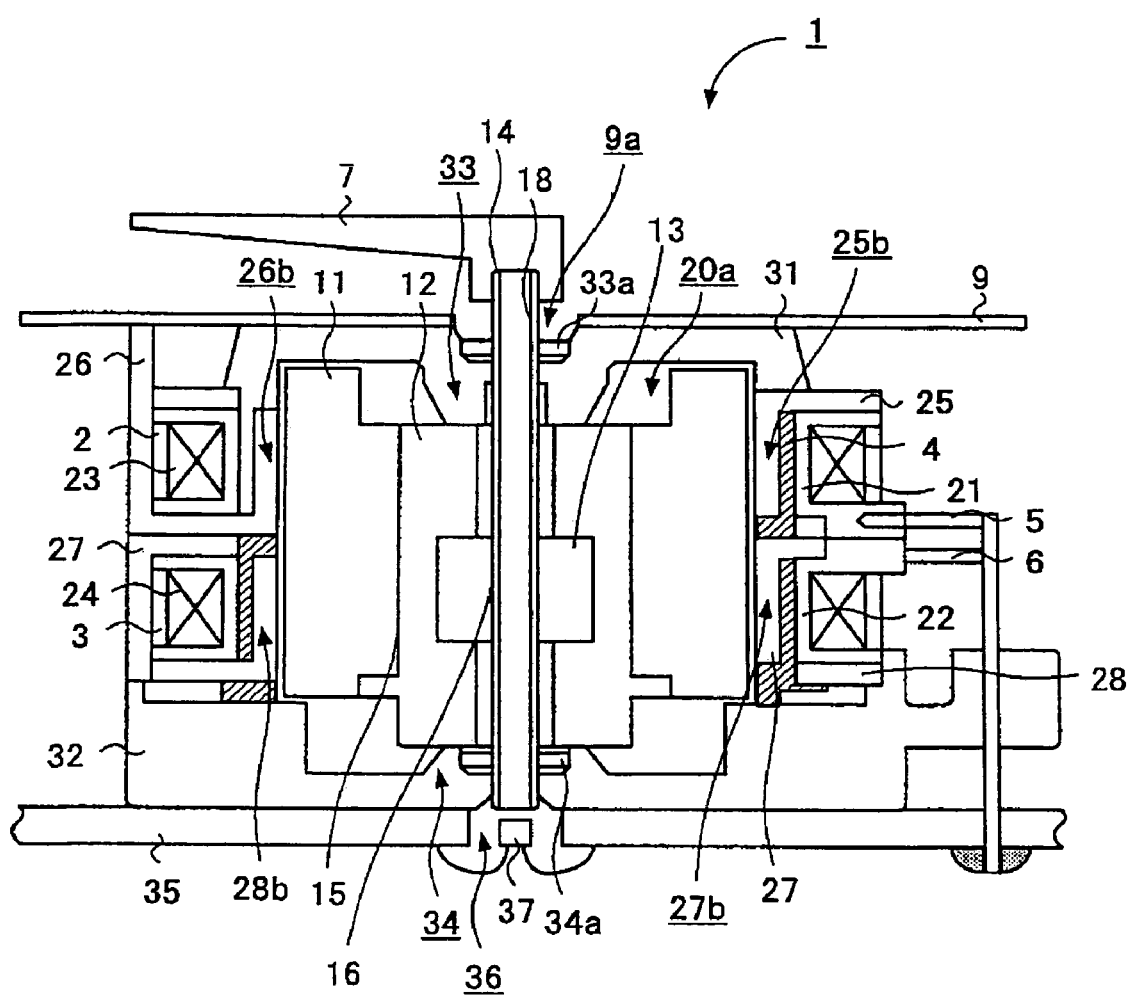
FIG. 3 shows a sectional view of an actuator section of a panel meter using the stepping motor shown in FIG. 1.

As shown in FIG. 3, the stepping motor 1 is mounted on a printed circuit board (PCB) 35 and the rotor assembly 10 of the stepping motor 1 is rotated, for example, by a signal (electric current) supplied from an external arithmetic or driving circuit (both not shown) to the respective terminal pins 5 and 6 of the exciting coils 23 and 24.

The stepping motor 1 is provided with an indicating needle 7, a display board 9 and the PCB 35 so as to constitute a panel meter. The indicating needle 7 is made of a transparent resin such as an acrylic resin and a polycarbonate resin so as to be light-transmissible. As a result, when light passes through the hollow 17 of the rotary shaft 14 and is guided inside of the indicating needle 7, the indicating needle 7 emits light.

The display board 9 is made of a sheet metal such as a stainless steel sheet and aluminum sheet, has its surfaces coated for deglossing. On one of the coated surfaces, a scale with characters and figures are printed so as to indicate a measured amount or value of traveling speed or engine rotation speed. The scale is printed using fluorescent paint, and becomes bright when light is irradiated. At the center of the display board 9, an opening 9a is provided so as to allow the rotary shaft 14 of the rotor assembly 10 to pass through.

Figure 6:
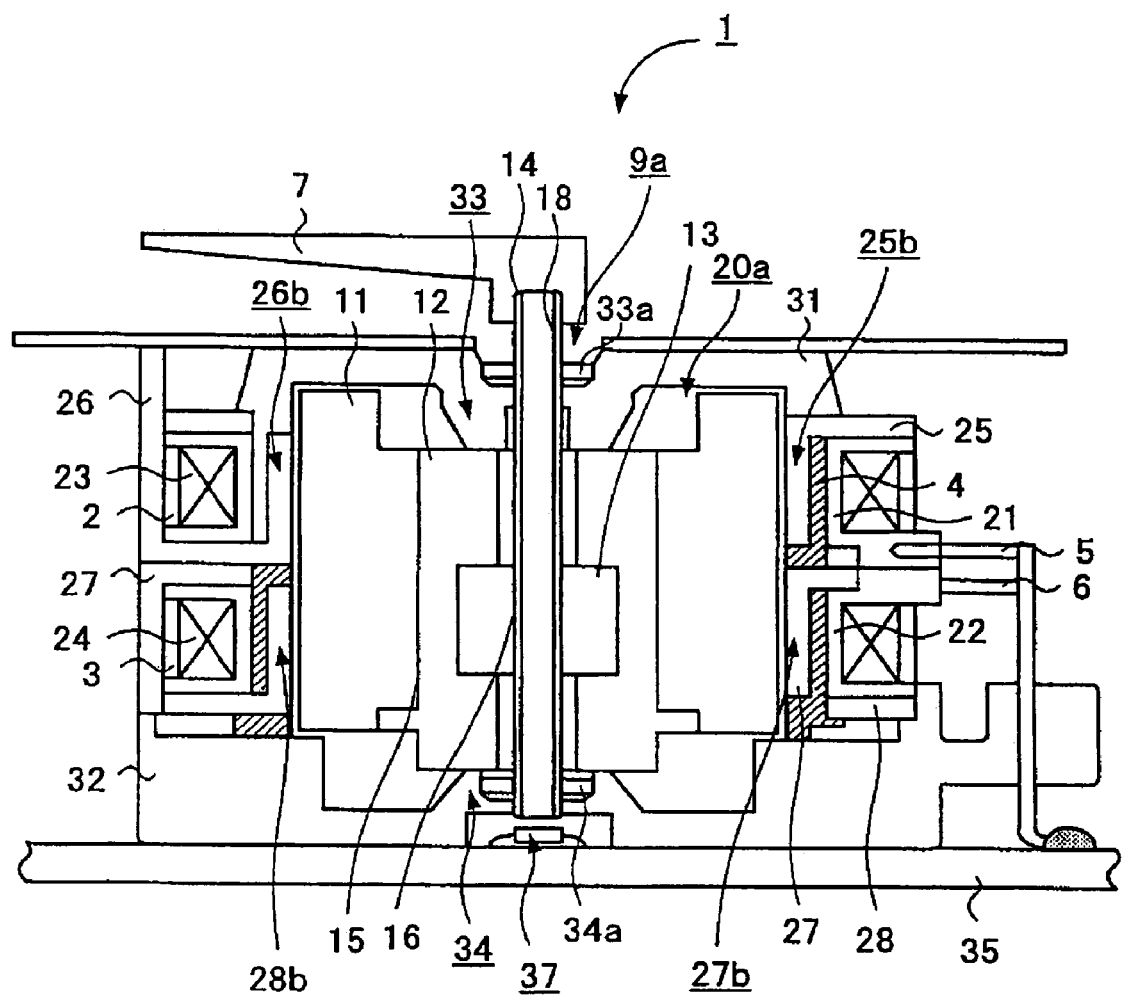
FIG. 6 shows a sectional view of another structure of the stepping motor according to the first embodiment of the present invention.

The PCB 35 supplies and controls electric current to flow in the exciting coils 23 and 24. An opening 36 is provided in the PCB 35 to allow the light therethrough so as to further pass through the hollow 17 of the rotary shaft 14 and an LED 37 as light source is set in the hollow 17. If the configuration of the rear plate 32 is modified as shown in FIG. 6, the opening 36 is not needed in the PCB 35, which makes the PCB 35 simpler.

The above stepping motor 1 is driven by the signal supplied to the exciting coils 23 and 24. The signal supplied to the exciting coils 23 and 24 is controlled, for example, by the external arithmetic or driving circuit according to the velocity of a vehicle and the engine revolution speed. The rotor assembly 10 is rotated by the signal according to the measured amount or value whereby the indicating needle 7 attached to the rotary shaft 14 indicates a point of the scale corresponding to the measured amount or value.

During a display of the measured amount or value on the display board 9, the light emitted from an LED 37 enters the hollow 17. The light partly reflected at the light-reflecting layer 18 is to be guided to the front end of the rotary shaft 14, and is introduced inside the indicating needle 7. Thus, the indicating needle 7 becomes bright.

A second embodiment of the present invention will hereinafter be described.

Figure 4:
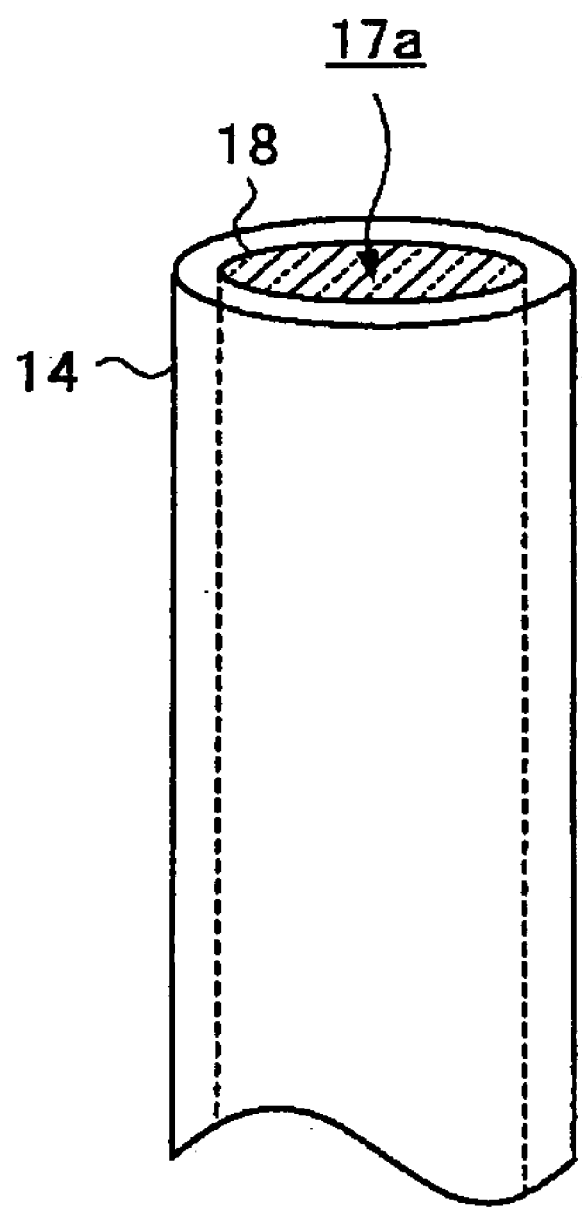
FIG. 4 shows a sectional view of a rotary shaft of a stepping motor according to the second embodiment of the present invention.

In the first embodiment, the hollow 17 provided in the rotary shaft 14 of the rotor assembly 10 is empty, but may be filled with, for example, a light-transmissible resin such as polycarbonate as shown in FIG. 4. In this case, the optical path is constituted by a light-transmissible resin 17a.

The light-transmissible resin 17a can be filled in the hollow 17 of the rotary shaft 14 simultaneously with the process of molding the rotary shaft 14 and the rotor magnet 11 using the molding resin 12. Therefore, any special and additional process is not required for this purpose. This structure prevents dust from entering the optical path formed inside the rotary shaft 14. This means the optical path is free from any blockage of light due to dust entering in the optical path.

Figure 5:
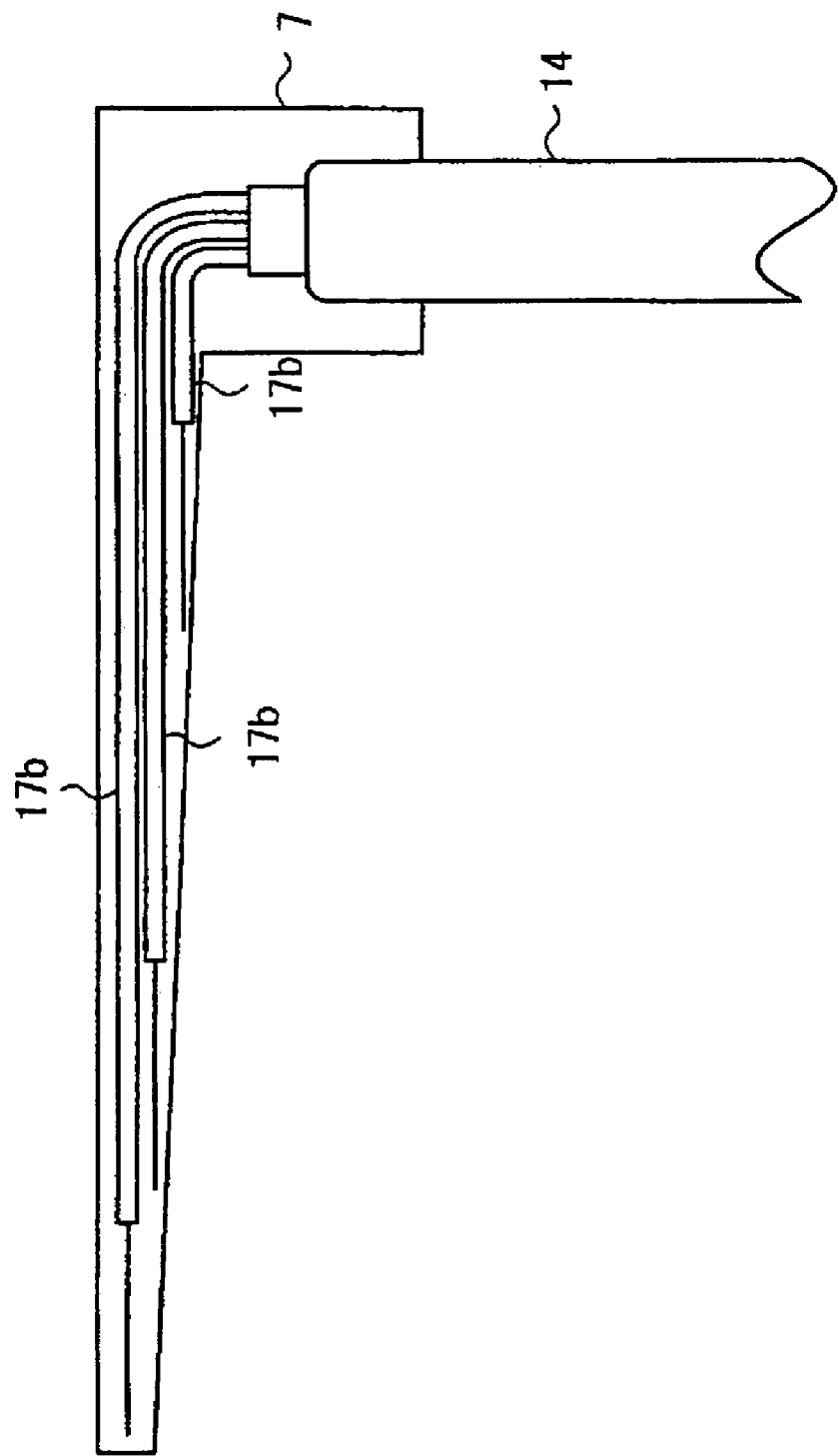
FIG. 5 shows a sectional view of an indicating needle attached to a rotary shaft of a stepping motor according to a third embodiment of the present invention.

A third embodiment of the present invention will hereinafter be described. In the second embodiment, the hollow 17 of the rotary shaft 14 is filled with the light-transmissible resin 17a, but may have at least an optical fiber 17b (or optical fibers) passing therethrough as shown in FIG. 5. One end of the optical fiber 17b is connected with the LED 37, and the other end is extended inside the indicating needle 7.

With this structure, light can be guided more effectively and efficiently without dissipation and attenuation. In addition, this structure enables the indicating needle 7 to transfer the light signal to the display board 9.

For example, if a light-detector is arranged at the scale indicating 80 km/h on the display board of a speed meter when the indicating needle 7 points to the scale at 80 km/h, the light-detector detects the light from the indicating needle 7 and produces a relevant electric signal. By using this signal, a warning buzzer can be activated for overspeeding.

The present invention is not limited to the above embodiments. For example, the rotor magnet 11 may be an electromagnet instead of a permanent magnet.

The rotary shaft 14 may have a plurality of slits. In this case, the rotary shaft 14 can guide light to a plurality of spots on the display board 9.

Also, the rotary shaft 14 may be made of a material other than a metallic material, such as a resin and a fiber reinforced plastic material.

And, the present invention may be applied to other motors than a stepping motor, such as a servo motor.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-202188 filed on Jul. 11, 2002 and including specification, claims, drawings and summary. The disclosure of the above Japanese Patent Application is incorporated herein by reference in its entirety.

What is claimed is:

1. A motor for a meter comprising:

a stator including a plurality of stator yokes, coils obtained by a winding of a magnet wire arranged on the stator yokes, and pole teeth arranged on an inner periphery of the stator yokes;

a rotor assembly disposed in a central portion of the stator with a gap opposing the pole teeth, the rotor assembly includes a magnet arranged on an outer periphery of a sleeve made of a resin and a rotary shaft made of metal, the rotary shaft is hollow-cylindrical with open ends, an inner wall of the rotary shaft is coated with a light-reflecting layer;

a front plate arranged at an upper end of the stator in an axial direction, the front plate is made of a first resin material and has a projection at its center to prevent axial play of the rotor assembly; and a rear plate arranged at a lower end of the stator in the axial direction, the rear plate is made of a second resin material and has a projection at its center to prevent axial play of the rotor assembly;

wherein the stator is integrally constituted by molding resin material for positioning and fixing each individual part of the stator, wherein the projections of the front and rear plates have respective bearings to rotatably support the rotary shaft.

2. A motor for a meter according to claim 1, wherein the rotary shaft is filled with a light-transmissible resin.

3. A motor for a meter according to claim 1, the first resin material is the same as the molding resin material.

4. A panel meter comprising:
- a display board which has a scale and an opening formed therein;
- a motor which is arranged at one side surface of the display board, and includes a stator, a rotary shaft included in a rotor assembly, a front plate and a rear plate, the rotary shaft having a first end passing through the opening of the display board so as to protrude from the other side surface of the display board, the rotary shaft is hollow-cylindrical with open ends, an inner wall of the rotary shaft is coated with a light-reflecting layer, the rotary shaft allowing light to pass therethrough in an axial direction, the front plate being arranged at an upper end of the stator in the axial direction, the front plate is made of a first resin material and has a projection at its center to prevent axial play of the rotor assembly, the rear plate being arranged at a lower end of the stator in the axial direction, the rear plate is made of a second resin material and has a projection at its center to prevent axial play of the rotor assembly;
- a light source which supplies light to a second end of the rotary shaft; and
- an indicating needle which is made of a light-transmissible material, and attached to the first end of the rotary shaft so as to receive the light having passed through the rotary shaft,
- wherein the stator is integrally constituted by molding resin material wherein the protections of the front and rear plates have respective bearing to rotatably support the rotary shalt.

5. A motor for a meter comprising:
- a stator including a plurality of stator yokes, coils obtained by a winding of a magnet wire arranged on the stator yokes, and pole teeth arranged on an inner periphery of the stator yokes;
- a rotor rotatably disposed in a central portion of the stator with a gap opposing the pole teeth, the rotor includes a magnet arranged on an outer periphery of a sleeve made of a resin and a rotary shaft made of a metal, the rotary shaft is hollow-cylindrical with both ends open, an inner wall of the rotary shaft directs a light emitted from a light source disposed at the one end of the rotary shaft to an indicating needle attached to the other end of the rotary shaft;
- a front plate arranged at an upper end of the stator in an axial direction, the front plate is made of a first resin material and has a projection at its center to prevent axial play the rotor; and
- a rear plate arranged at lower end of the stator in the axial direction, the rear plate is made of a second resin material and has a projection at its center to prevent axial play of the rotor;
- wherein the stator is integrally constituted by molding resin material for positioning and fixing each individual part of the stator,
- wherein the projections of the front and rear plates have respective bearings to rotatably support the rotary shaft.

* * * * *